United States Patent [19]

Cox et al.

[11] 4,293,883
[45] Oct. 6, 1981

[54] MAGNETIC HEAD MOUNT ASSEMBLY

[75] Inventors: Allen R. Cox, Chandlers Ford, England; Edmond W. Smathers, Boulder, Colo.

[73] Assignee: International Business Machines Corporation, Armonk, N.Y.

[21] Appl. No.: 107,103

[22] Filed: Dec. 26, 1979

[51] Int. Cl.³ .................. G11B 5/48; G11B 5/105; G11B 21/20
[52] U.S. Cl. ................... 360/104; 360/103; 360/129
[58] Field of Search ............ 360/104, 102–103, 360/109, 122, 97–99, 129

[56] References Cited

U.S. PATENT DOCUMENTS

| | | | |
|---|---|---|---|
| 3,023,279 | 2/1962 | Johnson et al. | 360/109 |
| 3,091,467 | 5/1963 | Fujimoto | 274/4 |
| 3,310,792 | 3/1967 | Groom et al. | 360/103 |
| 3,323,116 | 5/1967 | Solyst | 360/103 |
| 3,975,771 | 8/1976 | Lazzari | 360/104 |
| 4,003,091 | 1/1977 | Wright | 360/102 |
| 4,040,110 | 8/1977 | Bagby | 360/107 |
| 4,195,322 | 3/1980 | Cox et al. | 360/99 |

Primary Examiner—Alfred H. Eddleman
Attorney, Agent, or Firm—Nathan N. Kallman

[57] ABSTRACT

A magnetic head mount assembly for accessing data tracks recorded on a magnetic medium includes a mounting post, an arm element which engages the post, and a yoke on which circuit elements are disposed. An end portion of the post is slotted to receive electrical leads for connection to the magnetic head, which is supported by an air bearing slider positioned over the slotted end portion. The arm element is preferably frustoconical to reduce mass and weight, thereby enhancing access time.

7 Claims, 3 Drawing Figures

MAGNETIC HEAD MOUNT ASSEMBLY

DESCRIPTION

1. Technical Field

This invention relates to a novel magnetic head mount assembly, and in particular to an assembly which supports an air bearing slider for accessing data tracks of a magnetic medium.

An object of this invention is to provide an improved magnetic head mount assembly which can be fabricated as a unit and mass produced easily.

Another object of this invention is to provide an improved magnetic head mount assembly which requires less assembly operations during production, thereby reducing time and costs.

Another object is to provide a magnetic head mount assembly which requires less components than prior art head arm assemblies.

A further object is to provide a magnetic head mount assembly which incorporates a good tooling reference during production, and affords a reduced tolerance build-up.

2. Background Art

Presently known magnetic head arm assemblies employ a head slider mount which is bonded to a mounting bracket for machining, and then mounted to an actuator arm. This type of head arm assembly requires a multiplicity of machining operations, alignment procedures, and a large number of components for proper assembly. A major problem is to control the stack-up of tolerances for each assembly so that during mass production, the head arm assemblies are relatively uniform and standard and virtually interchangeable.

BRIEF DESCRIPTION OF THE DRAWINGS

The invention will be described in detail with reference to the drawings in which.

DISCLOSURE OF THE INVENTION

Figure 1:
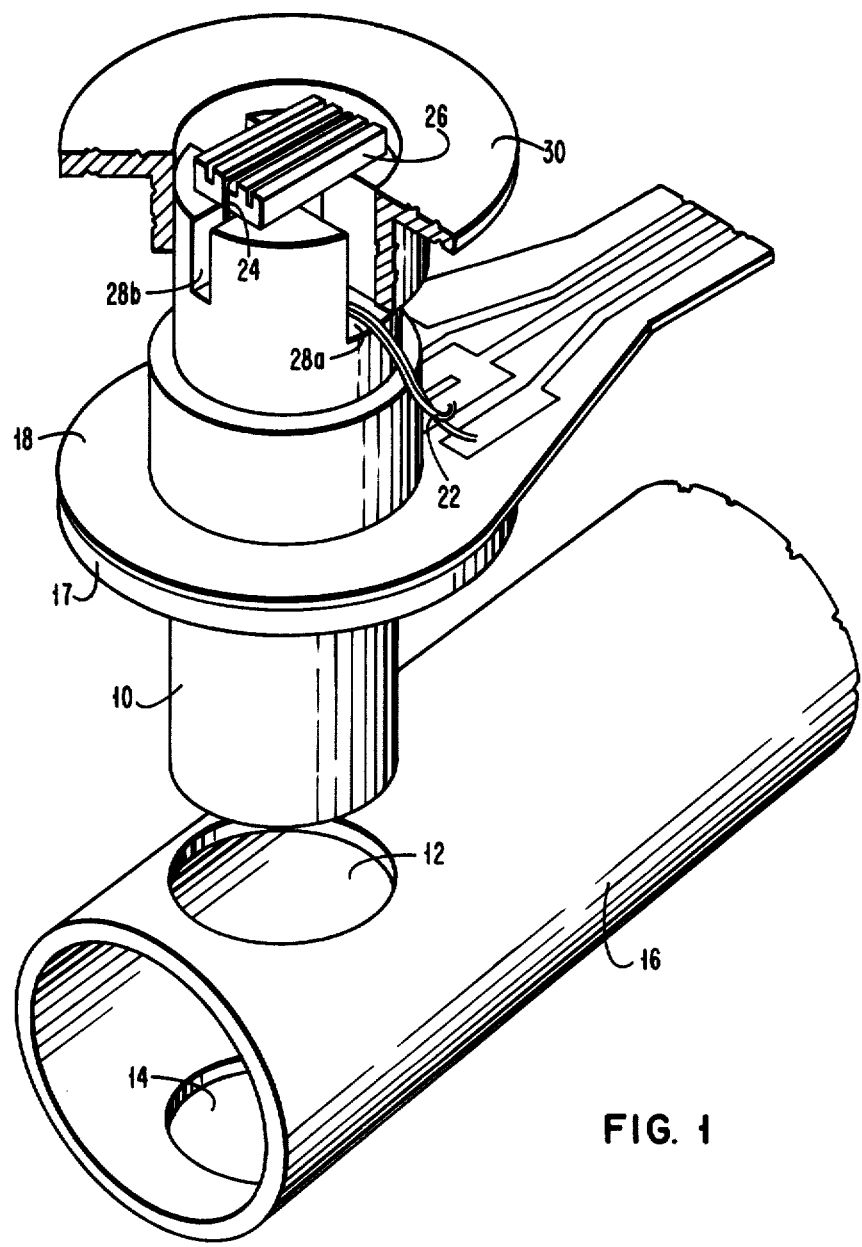
FIG. 1 is an isometric view, partly cut away, of the magnetic head mount assembly of this invention.

With reference to FIG. 1, a magnetic head mount assembly includes a mounting post 10, which may be made of a ceramic material. The cylindrical post 10 is seated in apertures 12 and 14, formed in a frustoconical arm 16 which has an axis substantially perpendicular to the axis of the mounting post.

The post 10, which may be made of ceramic by way of example, is bonded by epoxy to the arm 16. A collar 17 made of plastic for example is coupled to the post 10 and supports a yoke 18 which is a printed circuit on flexible material (e.g. polymide). The printed circuits on yoke 18 are connected to external circuitry and power supply (not shown). The printed circuits on 18 are also connected by electrical leads 22 to a magnetic core 24, which is mounted to a configured air bearing slider 26, preferably made of barium titanate ceramic. The leads 22 pass through a slot 28a formed in the upper portion of the post 10, over which the slider 26 is positioned. The magnetic head 24 comprises a ferrite core which is partially disposed within a slot 28b that is formed orthogonally to slot 28a.

An annular stabilizer ring 30, such as disclosed in U.S. Pat. No. 4,003,091 and which is partially shown in FIG. 1, is joined to the upper post portion adjacent to the slots 28a,b. The stabilizer ring 30 may be made of chrome plated brass. In operation, the integral head mount assembly is driven for accessing data tracks on a magnetic medium by a bidirectional actuator, such as a voice coil motor (not shown), which is attached at the end of the arm 16.

Figure 2:
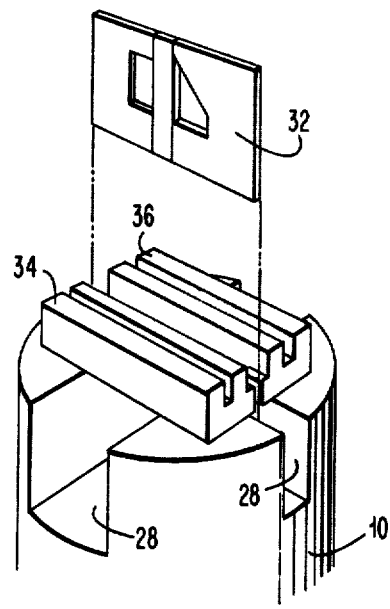
FIG. 2 is a three-dimensional enlarged view of a portion of the magnetic head mount assembly of FIG. 1.

FIG. 2 illustrates in a partial exploded view the relation of the ferrite core transducer 32 that is bonded between slabs 34 and 36, which may be made of barium titanate ceramic for example. The slabs 34 and 36 enclose the ferrite core transducer 32 and form an air bearing slider. In this embodiment, the ferrite core 32 is partially disposed within a slotted portion of post 10 as illustrated in FIG. 1. The position of the transducer core may be adjusted so that the transducing gap will be precisely located with relation to the head mount assembly and, in effect, with respect to the magnetic medium with which it interacts. The surface of the ferrite core may be ground and lapped to predetermined dimensions to attain a desired throat height.

Figure 3:
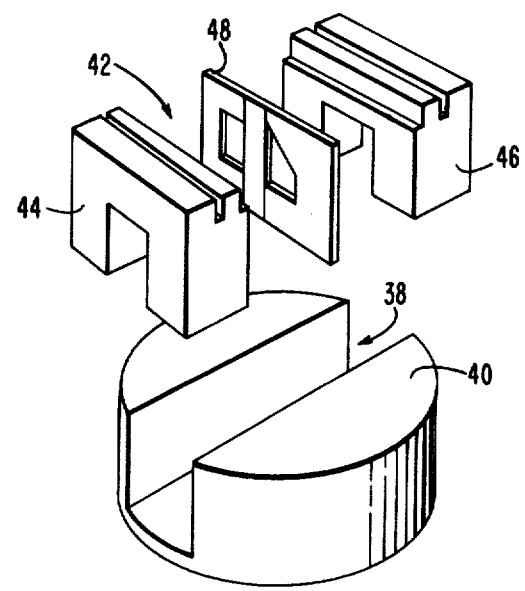
FIG. 3 is a three-dimensional enlarged view of a portion of an alternative embodiment of the magnetic head mount assembly.

FIG. 3 depicts, in exploded form, an alternative embodiment wherein a single slot 38 is formed at the top portion of an annular support 40 on which the air bearing slider 42 is seated. The slider 42 includes barium titanate ceramic slabs 44 and 46 which sandwich a ferrite core 48. The sandwiched slider structure is fixed onto the top surface of the slider support 40, which serves as a reference base for determining the position and orientation of the slider 42 and transducer core 48. In addition, the slot 38 serves to accommodate the electrical leads from the printed circuit which connect to the coil associated with the transducer core.

By virtue of this simplified assembly having a reduced number of parts, the magnetic head and mount may be easily mass produced by easy tooling techniques, thus reducing manufacturing time and cost. The mounting post serves as a good tooling reference or datum, and reduces the tolerance stack-up. The ferrite core is less stressed in the disclosed assembly and therefore improved electrical performance and enhanced signal outputs are realized. The completed assembly can be easily mounted to an actuator by direct coupling.

It should be understood that the invention is not limited to the types of materials described above, but they may be modified or changes within the scope of the invention.

What is claimed is:

1. A magnetic head mount assembly comprising:
   a mounting post having a slotted portion at one end;
   an arm element having two opposing apertures for receiving said post in a close fit engagement; and
   an air bearing slider for supporting a magnetic transducing means mounted to said one end of said post at said slotted portion.

2. A magnetic head mount assembly as in claim 1, including means attached to said post for supporting circuit elements for connection to said magnetic transducing means.

3. A magnetic head mount assembly as in claim 2, wherein said circuit elements include electrical leads which pass through said slotted portion.

4. A magnetic head mount assembly as in claim 2, wherein said means for supporting circuit elements comprises a yoke structure.

5. A magnetic head mount assembly as in claim 1, wherein said arm element has a frustoconical configuration.

6. A magnetic head mount assembly as in claim 1, wherein said slotted portion is formed with two intersecting slots.

7. A magnetic head mount assembly as in claim 1, wherein said magnetic transducing means is disposed within said slotted portion.

* * * * *